(12) United States Patent
Tamor

(10) Patent No.: US 6,746,366 B2
(45) Date of Patent: Jun. 8, 2004

(54) CONTROL SYSTEM AND CONTROL METHOD FOR A HYBRID ELECTRIC VEHICLE POWERTRAIN

(75) Inventor: Michael Alan Tamor, Toledo, OH (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/225,824

(22) Filed: Aug. 22, 2002

(65) Prior Publication Data

US 2003/0004032 A1 Jan. 2, 2003

Related U.S. Application Data

(63) Continuation-in-part of application No. 09/686,471, filed on Oct. 11, 2000, now abandoned.

(51) Int. Cl.$^7$ .......................... B60K 41/02; B60K 1/00; B60K 6/00; B60K 16/00
(52) U.S. Cl. ................. 477/5; 477/6; 477/8; 180/65.2; 180/65.3
(58) Field of Search .............................. 477/5, 6, 8, 12, 477/14, 15, 20; 180/65.2, 65.3

(56) References Cited

U.S. PATENT DOCUMENTS

| 5,285,111 A | 2/1994 | Sherman |
| 5,343,970 A | 9/1994 | Severinsky |
| 5,635,805 A | 6/1997 | Ibaraki et al. |
| 5,697,466 A | 12/1997 | Moroto et al. |
| 5,713,814 A | 2/1998 | Hara et al. |
| 5,842,534 A | 12/1998 | Frank |
| 5,935,040 A | 8/1999 | Tabata et al. |
| 6,026,921 A | 2/2000 | Aoyama et al. |
| 6,059,059 A * | 5/2000 | Schmidt-Brucken ....... 180/65.3 |
| 6,164,400 A * | 12/2000 | Jankovic et al. .......... 180/65.2 |
| 6,176,808 B1 | 1/2001 | Brown et al. |
| 6,208,034 B1 * | 3/2001 | Yamaguchi ................ 290/40 C |
| 6,253,140 B1 | 6/2001 | Jain et al. |
| 6,253,865 B1 | 7/2001 | Suzuki |
| 6,299,565 B1 | 10/2001 | Jain et al. |
| 6,364,807 B1 | 4/2002 | Koneda et al. |
| 6,367,570 B1 * | 4/2002 | Long et al. ................ 180/65.2 |
| 6,393,350 B1 | 5/2002 | Light et al. |
| 6,441,506 B2 * | 8/2002 | Nakashima ................ 290/40 C |
| 6,524,216 B2 * | 2/2003 | Suzuki et al. .................. 477/3 |
| 6,533,701 B2 * | 3/2003 | Maruyama ..................... 477/5 |

FOREIGN PATENT DOCUMENTS

| EP | 0 812 717 A2 | 12/1997 |
| JP | 2000-219062 | 8/2000 |

* cited by examiner

Primary Examiner—Tisha D. Lewis
(74) Attorney, Agent, or Firm—Brooks Kushman; Carlos L. Hanze

(57) ABSTRACT

A control and control method for a powertrain for a parallel hybrid electric vehicle (HEV) method and system, including a pre-transmission internal combustion engine (ICE), an electric traction motor/generator (motor), and a controller for the motor to emulate the behavior of the internal combustion engine. Emulation strategy allows the use of the same transmission hardware and control for both the engine and the motor in each of several operating modes. The complexity of the parallel HEV powertrain system is reduced, and vehicle performance is consistent with a substantially constant drive force.

15 Claims, 1 Drawing Sheet

CONTROL SYSTEM AND CONTROL METHOD FOR A HYBRID ELECTRIC VEHICLE POWERTRAIN

CROSS-REFERENCE TO RELATED APPLICATIONS

This application is a continuation-in-part of U.S. application Ser. No. 09/686,471, filed on Oct. 11, 2000, now abandoned.

BACKGROUND OF THE INVENTION

1. Field of the Invention

The present invention relates generally to a parallel hybrid electric vehicle (HEV) and, specifically, to a method and system of operating a pre-transmission powertrain motor in an engine emulation mode when the engine is not running and is not connected to the powertrain.

2. Background Art

The need to reduce fossil fuel consumption and exhaust emissions from vehicles powered by an internal combustion engine (ICE) is well known. Vehicles powered by electric motors have attempted to address this need. However, electric vehicles have limited range and power capabilities, and they require substantial time to recharge their batteries. An alternative solution is to combine both an ICE and an electric traction motor in one vehicle. Such vehicles typically are called hybrid electric vehicles (HEVs). See generally U.S. Pat. No. 5,343,970 (Severinsky).

HEVs reduce emissions and fuel consumption because a smaller engine can be used. Further, under certain conditions, the engine can be turned off.

The HEV has been described in a variety of configurations. Many known HEV designs require an operator to select between electric and internal combustion operation. In other configurations, the electric motor drives one set of wheels and the ICE drives a different set of wheels.

Other more useful configurations include, for example, a series hybrid electric vehicle (SHEV), which is a vehicle with an engine (most typically an ICE) that powers a motor/generator. The motor/generator, in turn, provides electric power for a battery and traction torque for the drive wheels of the vehicle. No mechanical connection exists between the engine and the drive wheels. Further, a parallel hybrid electrical vehicle (PHEV) is a vehicle with an engine (most typically an ICE), battery and electric traction motor that combine to provide torque to the drive wheels of the vehicle. A clutch connects the engine crankshaft to the motor.

A parallel-series hybrid electric vehicle (PSHEV) has characteristics of both the PHEV and the SHEV. The PSHEV is also known as a torque (or power) split powertrain configuration. Here, the engine torque can be used to power a motor/generator and/or contribute to the necessary wheel or output shaft torque. The motor/generator can be used to generate electric power for the battery, or it can contribute to the necessary wheel or output shaft torque. The motor/generator can be used also to recover braking energy for the battery if a regenerative braking system is used.

The desirability of combining the ICE with an electric motor is clear. Fuel consumption and engine exhaust emissions are reduced with no appreciable loss of performance or range of the vehicle. Nevertheless, there remains substantial room for development of ways to optimize HEV operation.

One such area of development involves minimizing the complexity of the HEV powertrain system to achieve an affordable product while ensuring vehicle performance that is consistent, predictable and pleasing to the customer.

One way to minimize HEV cost is to choose a compatible transmission type. Several types are available and known in the prior art including a torque converter transmission, CVT, lay shaft, dual lay shaft and an electric converterless automatic transmission (ECLT). The ECLT, which is used in the embodiment of the invention presently disclosed, is a modified version of a planetary automatic transmission.

A planetary transmission, such as an automatic transmission currently in production, relies on hydraulic pressure to operate its internal pressure actuators and deliver torque from the engine to the drive shaft. In a conventional ICE powertrain application, a pump driven by the engine via the transmission input shaft generates the hydraulic system pressure.

Converterless automatic transmissions (CLT) have potential as a high-efficiency, low-cost transmission for small vehicles, where a torque multiplication function of the converter would not be necessary. The CLT may be a modification of an automatic transmission presently used in the automobile industry wherein the torque converter and its one-way clutch have been removed and the forward/reverse clutch has been modified to function as a drive-away clutch.

While some of the synergies of a CLT with respect to a HEV powertrain are immediately apparent, a CLT appears to be appropriate for a HEV powertrain also for less apparent reasons: 1) the HEV powertrain motor used with a CLT can be used to equal or even exceed the performance of a conventional powertrain, and 2) the high torque at low revolutions per minute (RPM) of the powertrain motor allows clutch engagement at much lower engine rpm, reducing the heat load in the drive-away clutch by approximately 70%.

The ECLT is essentially a conventional transmission integrated with a low-storage requirement (LSR) hybrid. The LSR hybrid is a system that is capable of all hybrid functions except for electric-only propulsion with the ICE turned off. A preferred system, however, would include a "full hybrid" product in which the hybrid system is capable of an electric-only drive mode with the ICE turned off.

It may be more efficient to replace the engine-driven hydraulic pump with an electric pump in a HEV. This conclusion rests on two assumptions: 1) the pump will have the ability to modulate the hydraulic pressure to accommodate the actual torque delivered to the transmission (as opposed to simple speed dependent pressure developed by a mechanical pump), which will improve overall system efficiency, and 2) when in an engine-off electric driving mode, the vehicle will be launched and driven at low speed with the drive clutch, if any, locked and the drive motor turning at low speed. In the HEV, an ICE driven hydraulic pump at that time would be turning too slowly to generate enough pressure to allow the transmission to carry torque.

In a prior art pre-transmission configuration of the parallel HEV (wherein the powertrain motor is connected to the transmission input), the power of the electrified hydraulic pump is quite large (e.g., several kilowatts). This necessitates a high voltage pump with associated power electronics. The large motor and power electronics module are expensive, and that expense should be avoided unless it is justified by a very significant fuel economy benefit (see U.S. Pat. No. 6,026,921).

Because electric power needed to run the pump must be generated by the engine when it is on and drawn from the battery when it is off, the finite efficiency of the motor/ generator, combined with the turn-around efficiency of the battery, could offset the efficiency improvement of the electric pump itself. Furthermore, the electrified hydraulic pump is physically quite large, presenting a weight and packaging problems.

SUMMARY OF THE INVENTION

An objective of the present invention is to minimize the complexity and reduce the cost of a parallel hybrid electric vehicle (HEV) powertrain system. The embodiment of the invention presently disclosed allows the HEV engine and motor to use the same transmission hardware and control. Another object of the present invention is to provide a parallel HEV system and method whereby powertrain performance is consistent, predictable and pleasing to the customer.

Specifically, the present invention comprises an emulation system and control strategy comprising: a source of power comprising an internal combustion engine (ICE) and an electric traction drive motor/generator (motor); a vehicle system control (VSC); a controller within the VSC including a drive force control device for the ICE, whereby engine torque and engine on/off state are controlled; the powertrain source being operatively connected to the input of an electrified converterless transmission (ECLT); a power transfer device connected to the output of the ECLT; and a disconnect clutch in the powertrain between the ICE and the motor. When the vehicle engine is off and disconnected from the powertrain, the drive motor is operated in a manner that emulates the behavior of the internal combustion engine, whereby the motor will react just as the ICE would have reacted when subject to comparable inputs.

This engine emulation offers considerable control advantages. It allows the same transmission control to be used in either an ICE driving mode, a motor driving mode, or a combined driving mode. The modest fuel economy penalty of "idling" the drive motor while the vehicle is at rest may be reduced by lowering the motor speed to the minimum required to maintain hydraulic pressure, this speed being much lower than typical ICE idle speeds. There is no need for a special zero and low-speed transmission control for electric driving, such as the controls found in the prior art. Another advantage of this "engine emulation" control scheme is that whenever the necessity arises to start the engine, the transmission input is already at the appropriate speed. The engine can be started by closing the disconnect clutch between the engine and the motor, and a smooth transition to ICE power is ensured.

A typical internal combustion engine with a driver-operated throttle is characterized by a wide range of torque values depending upon the throttle setting. A typical internal combustion engine further is characterized by a wide range of speeds between an idle speed and the upper engine speed limit in a characteristic plot for a typical combustion engine. The effective operating area of the engine exceeds the effective operating area of a characteristic plot of torque and speed for an electric motor. Engine torque emulation, therefore, can be realized when the electric motor is operating within its speed and torque limits.

The torque emulation feature of the present invention comprises a strategy and method for achieving an efficient torque-speed relationship for the motor that corresponds to the torque-speed relationship of the engine within one operating zone in which the internal combustion engine is off and the motor is operative as well as in another operating zone in which the engine is operative and the motor is inoperative. There also is an intermediate operating zone in which the motor may function to deliver driving power, although it does so with less efficiency.

When the driveline is in a static mode and the engine is turned off, the characteristic speed-torque relationships are emulated by the motor controller. The speed-torque data at that time are stored in the ROM portion of the controller memory and accessed by the controller in response to a driver-controlled accelerator position input. In the case of a dynamic state of the operation of the motor, the transmission input is equal to the emulated internal combustion engine torque perceived by the motor control corresponding to the torque commanded by the transmission.

The torque commanded by the transmission would be used to avoid a torque interruption or torque hole during ratio shifts in the transmission; or to add torque, for example, during a transient condition. The torque commanded by the transmission may be a so-called feed-forward torque wherein the control system responds immediately to a demand for torque using a torque feed-forward technique of the kind shown, for example, in U.S. Pat. Nos. 6,393,350, and 6,253,140.

The '350 patent discloses a transmission with an electronic throttle actuator, which communicates with the controller whereby the leading indicator of torque is distributed to the throttle actuator. The engine throttle setting changes quickly in response to the torque request. In the case of the control system of the '140 patent, a similar torque feed-forward technique is used to improve the response to changes in transmission input torque. In this way, a desired clutch slip of the friction elements of the transmission during a ratio change is effected.

An electronic controller for the transmission friction clutches may respond to changes in engine torque based on a change in throttle position whereby a change in torque is anticipated using a torque feed-forward term to modify the desired torque. The torque values are converted by the controller to a pressure value as a function of the difference between the desired torque and the actual torque.

An example of an automatic transmission that can be used in a powertrain that does not include a torque converter is shown in U.S. Pat. No. 6,299,565. An example of the use of a transmission of the type shown in the '565 patent in a hybrid powertrain is disclosed in U.S. Pat. No. 6,364,807. Clutch pressure in that reference disclosure can be modulated to provide for a smooth power transfer with minimal disturbance due to inertia forces.

The patents identified in this description are owned by the assignee of the present invention. They are incorporated by reference in this description.

When the internal combustion engine is operating and the motor is inactive, the transmission input is determined by the speed-torque characteristics for the internal combustion engine. When the engine is inoperative and the motor is operative, the motor generates the same torque that would be developed by the engine if the engine were operating in the same operating zone as the motor. When the torque commanded by the transmission is emulated internal combustion engine torque, the transmission input torque is the same as the transmission input torque that would exist if the engine were operative and the motor were inoperative.

DETAILED DESCRIPTION OF THE PREFERRED EMBODIMENT(S)

The embodiment disclosed is a parallel HEV with a pre-transmission drive motor and an electronic converterless transmission (ECLT). Nevertheless, the invention could be applied to other means for ratio changing. The pre-transmission drive motor does not exclude having more motors elsewhere in the configuration.

Figure 1:
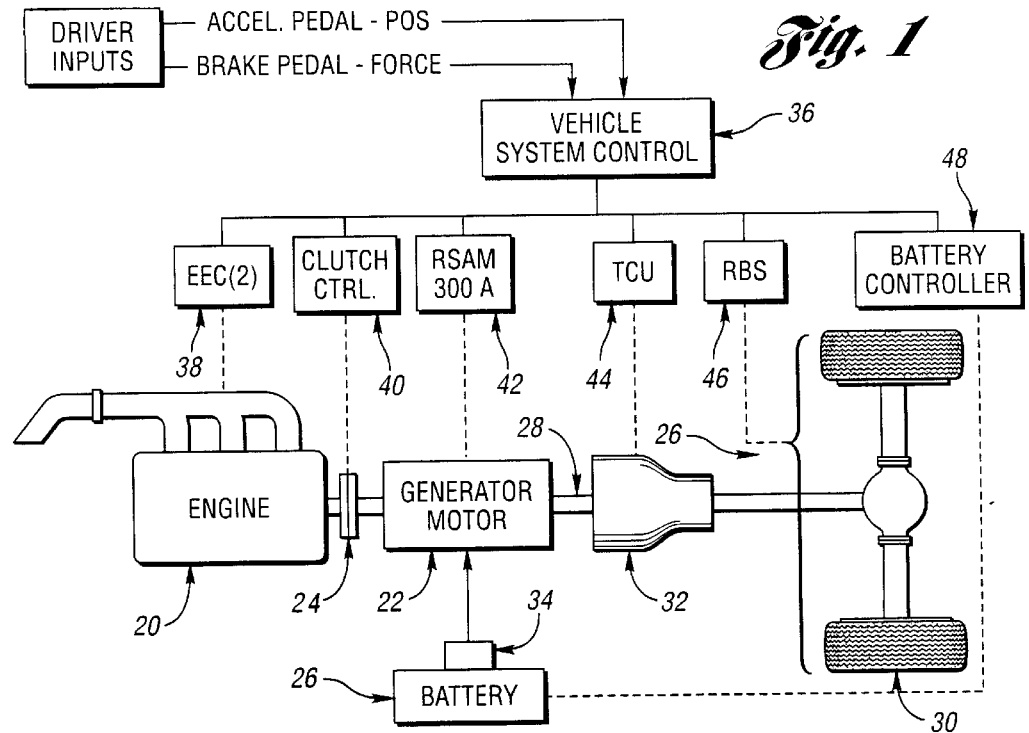
FIG. 1 illustrates the general components of a hybrid electric vehicle (HEV) powertrain with an engine disconnect clutch and vehicle system control.

FIG. 1 shows general components of a pre-transmission parallel HEV powertrain with an engine disconnect clutch. An engine 20 is linked to an electric motor/generator 22 via a disconnect clutch 24. A battery 26 is connected to the motor/generator 22 via an inverter 34, which allows the flow of electrical power to and from the two components. The motor/generator 22 is connected to a power transfer device 28, such as a drive shaft, which is connected to vehicle wheels 30 via a transmission 32. Thus, torque flows from the engine 20 and motor/generator 22 through the power transfer device 28 to the wheels 30.

All powertrain components are under the control of vehicle system controller (VSC) 36. Within the VSC 36, each powertrain component has a separate controller. An engine controller 38 controls the engine 20. For this application, an electronic throttle control would be used. The disconnect clutch 24 is under the control of a clutch controller 40. The motor/generator 22 is under the control of a motor/generator controller 42. The transmission 32 is under the control of a transmission control unit 44.

In the embodiment shown, the transmission 32 is an electronic converterless transmission (ECLT). The ECLT is a fully synchronous, high-efficiency, power-shifting transmission, which is known in the prior art. The torque amplification function of the torque converter is provided by the motor/generator 22. The motor/generator 22 is also used for shift synchronization and dynamic control. Coordination of conventional vehicle friction brakes and the retarding action of regenerative braking with the electric drive system is managed by the regenerative brakes system (RBS) control 46. The battery 26 is under the control of a battery controller 48.

Since the engine 20 can be disconnected from the motor/generator 22 and the power transfer device 28, there are three potential powertrain states. These states, which are based on various vehicle demands and commands for the VSC 36, include operation of the engine 20 only, the motor/generator 22 only, or either the engine 20 or the motor/generator 22. The disclosed embodiment of the invention functions when either the engine or the motor/generator 22 is connected to the power transfer device 28.

Because the torque-summing point of the two power sources (i.e., the engine 20 and the motor/generator 22) is at the input of the transmission 32, driving dynamics can be managed "trivially" by controlling the motor/generator 22 so as to mimic the engine 20. This means that, while in an electric driving mode, the "throttle" response of the motor/generator 22 will be identical to that of the engine 20 under otherwise identical conditions from the driver and vehicle point of view. This motor/generator controller 42 essentially makes the motor/generator 22 a "pseudo-engine." During shifts, where the transmission controller 44 manages (to the best of its ability) driveline dynamics, the motor/generator 22 again is controlled so as to mimic the engine 20.

Nevertheless, there is one difference: the ECLT relies upon very rapid control of motor/generator 22 torque to manage shifts regardless of whether the engine 20 is running. This "fast control" can be superimposed on the slower "pseudo-engine" response of the motor/generator 22 to again result in identical behavior with and without the engine 20 running.

Operational differences exist between the operation of present invention and the prior art designs. Specifically: (1) the present invention has an idle mode (i.e., a finite motor speed at zero vehicle speed) in which the motor/generator 22 serves only to drive the transmission 32 hydraulic pump (thus eliminating the need for additional, heavy, large, expensive electrical components); (2) vehicle launch and low speed driving will be accomplished with a slipping clutch analogous to the slipping torque converter of a conventional prior art automatic transmission; and (3) the vehicle cost and weight are reduced, and vehicle operational simplicity and consistency are improved. Vehicle launch and shifts will feel the same to the vehicle operator whether the engine 20 is on or off, and the transmission 32 will not shift to a new input speed when the engine 20 goes on or off.

The torque flow equation for the powertrain, when the engine is "on", is expressed as follows:

$$Tq(IC)+Tm(Trans)=TransInputTq$$

The torque flow equation for the powertrain, when the engine is "off" and the motor is "on", is expressed as follows:

$$Tm(ICemulation)+Tm(Trans)=TransInputTq$$

In the above equations, the TransInputTq terms are equal, which is an objective of the invention. The term T(Trans) is the torque commanded by the transmission controller to accommodate transient torque requirements (e.g., extra torque to avoid inertia forces during engagement and disengagement of friction elements during a shift).

Figure 2:
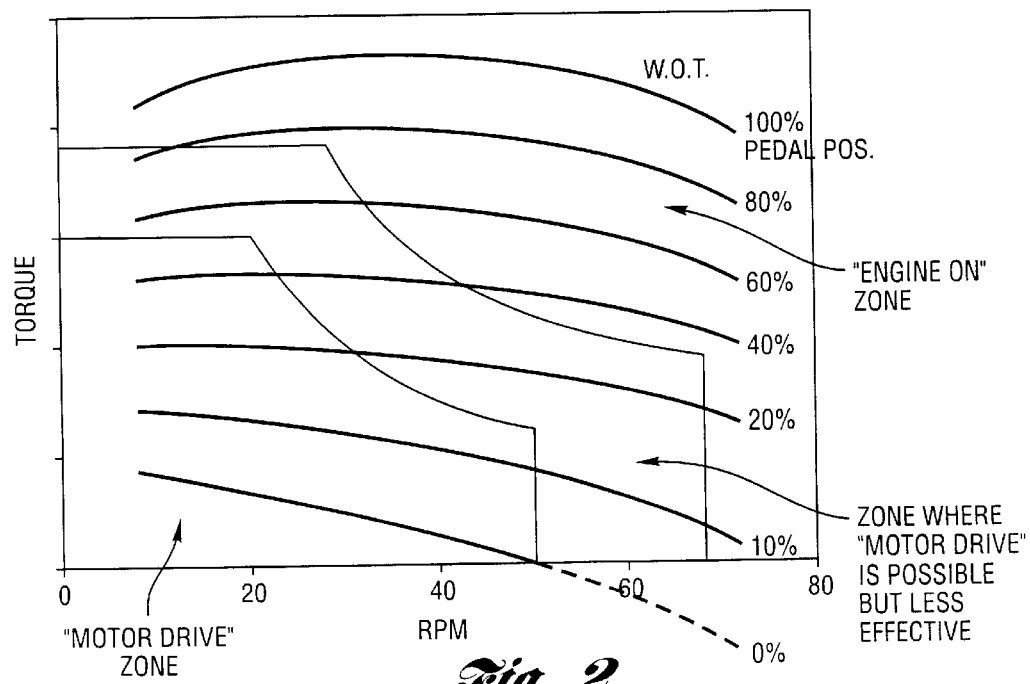
FIG. 2 is a plot of torque versus rpm for a motor drive and an internal combustion engine drive for various engine throttle settings.

FIG. 2 is a speed-torque powertrain performance plot illustrating an "engine on" zone, where only the engine operates. This zone is at the higher speed range of the plot. The torque values illustrated in FIG. 2 are shown for various throttle positions. The motor is not capable of operating in this zone.

The motor drive zone in FIG. 2 is the area of the plot at a low speed range where the engine is off. It is in this zone that the motor is most efficient.

FIG. 2 also shows an intermediate zone where operation of the motor is possible, but it is less efficient. In this zone, the engine may be allowed to operate together with the motor. The effective powertrain drive torque at that time would be the sum of the motor torque and the engine torque.

While the best mode for carrying out the invention has been described, those familiar with the art to which this invention relates will recognize various alternative designs and embodiments for practicing the invention. All such alternative designs and embodiments and equivalents thereof are defined by the following claims.

What is claimed:

1. A control for a hybrid electric vehicle powertrain comprising:

a throttle-controlled internal combustion engine, an electric motor/generator with an electrical power source and a multiple ratio transmission, the motor/generator being connected drivably to a torque input side of the transmission, a clutch for establishing and disestablishing a connection between the engine and the torque input side of the transmission, a torque output side of the transmission being connected to vehicle traction wheels;

the engine being characterized by a speed-torque relationship that is a function of engine throttle position in an engine drive zone throughout a first range of torque values and throughout a first range of speed values;

the motor being characterized by a speed-torque relationship in a motor drive zone throughout a second range of torque values that is smaller than the first range of torque values and throughout a second range of speed values that is smaller than the first range of speed values;

means for emulating the speed-torque relationship of the engine by the motor/generator when the speed and torque values are within the second torque and speed ranges, respectively;

the transmission including pressure-activated friction elements that define torque flow paths and a hydraulic pump at a torque input side of the transmission for developing a control pressure for the friction elements; and the motor being drivably connected to the hydraulic pump at zero vehicle speed, the motor speed being controlled at a finite idle value at zero vehicle speed to maintain a minimal transmission control pressure for the transmission friction elements.

2. The control set forth in claim 1 including means for selectively engaging and disengaging the clutch wherein the powertrain delivers power to the traction wheels from the motor/generator with the clutch disengaged and wherein the powertrain delivers power to the traction wheels from the engine when the clutch is engaged.

3. A method and strategy for a hybrid electric vehicle powertrain having a throttle-controlled internal combustion engine, an electric motor/generator with an electrical power source and a power transmission, the transmission having pressure-activated friction elements that define torque slow paths, a clutch for establishing and disestablishing a connection between the engine and the torque input side of the transmission, a torque output side of the transmission being connected to vehicle traction wheels, the motor being drivably connected to a hydraulic pump for pressurizing the friction elements; the method and strategy comprising:

controlling motor speed to maintain transmission control pressure for the transmission friction elements, including a minimal transmission control pressure at zero vehicle speed;

establishing an engine drive zone characterized by speed-torque relationships that are functions of engine throttle position throughout a first range of torque values and throughout a first range of speed values;

establishing a motor drive zone characterized by a speed-torque relationship throughout a second range of torque values that is smaller than the first range of torque values and throughout a second range of speed values that is smaller than the first range of speed values; and emulating the speed-torque relationship of the engine by the motor/generator when the speed and torque values are within the second torque and speed ranges, respectively.

4. The method and strategy set forth in claim 3 including the step of disengaging the clutch to effect power delivery by the powertrain solely from the motor/generator as the engine is rendered inactive.

5. The method set forth in claim 3 including the step of starting the engine by engaging the clutch as a transition is made from the motor drive zone to the engine drive zone.

6. The method and strategy set forth in claim 3 including the step of starting the engine, when the engine is inactive, by engaging the clutch and using motor/generator torque to eliminate torque disturbance due to engine friction and engine inertia.

7. The method and strategy set forth in claim 3, including the step of selectively engaging and disengaging the clutch whereby the powertrain delivers power to the traction wheels from the motor-generator with the clutch disengaged and whereby the powertrain delivers power to the traction wheels from the engine when the clutch is engaged.

8. The method and strategy set forth in claim 3, including the step of selectively engaging and disengaging the clutch whereby the powertrain delivers power to the traction wheels from the motor/generator with the clutch disengaged and whereby the powertrain delivers power to the traction wheels from the engine when the clutch is engaged.

9. A method and strategy for a hybrid electric vehicle powertrain having an internal combustion engine, an electric motor/generator with an electrical power source, a power transmission with friction elements for establishing and disestablishing torque flow paths, a clutch for establishing and disestablishing a connection between the engine and the torque input side of the transmission, a torque output side of the transmission being connected to vehicle traction wheels, the method and strategy comprising:

establishing an engine drive zone characterized by speed-torque relationships that are functions of engine control input throughout a first range of torque values and throughout a first range of speed values;

establishing a motor drive zone characterized by a speed-torque relationship throughout a second range of torque values that is smaller than the first range of torque values and throughout a second range of speed values that is smaller than the first range of speed values; and emulating the speed-torque relationship of the engine by the motor/generator when the torque and speed values are within the second torque and speed ranges, respectively.

10. The method and strategy set forth in claim 9 including the step of disengaging the clutch to effect power delivery by the powertrain solely from the motor/generator as the engine is rendered inactive.

11. The method set forth in claim 9 including the step of starting the engine by engaging the clutch as a transition is made from the motor drive zone to the engine drive zone.

12. A method and strategy for a hybrid electric vehicle powertrain having an internal combustion engine, an electric motor/generator with an electrical power source, a power transmission with friction elements for establishing and disestablishing torque flow paths, a clutch for establishing and disestablishing a connection between the engine and the torque input side of the transmission, a torque output side of the transmission being connected to vehicle traction wheels, the method and strategy comprising:

establishing an engine drive zone characterized by speed-torque relationships that are functions of engine control input throughout a first range of torque values and throughout a first range of speed values;

establishing a motor drive zone characterized by a speed-torque relationship throughout a second range of torque values that is smaller than the first range of torque values and throughout a second range of speed values that is smaller than the first range of speed values;

establishing an intermediate operating zone intermediate the engine drive zone and the motor drive zone; and emulating the engine speed-torque relationship of the engine when the powertrain operates in the engine drive zone by using the motor/generator during operation in the intermediate operating zone when the clutch disconnects the engine.

13. The method and strategy set forth in claim 12 wherein the step of emulating the speed-torque relationship of the engine by the motor/generator includes slipping a transmission friction elements during vehicle launch and during slow vehicle speed driving when the powertrain is operating in the intermediate operating zone whereby the effective engine driving torque is increased as engine speed is increased for a given engine control input.

14. The method and strategy set forth in claim 9 wherein the step of emulating the speed-torque relationship of the engine by the motor/generator when the speed and torque values are in the second range, a response of the motor/generator to a power demand being substantially similar to a response to engine control input when the powertrain is operating in the first range of torque values and in the first range of speed values with the engine on whereby the motor/generator functions as a pseudo-engine.

15. The method and strategy set forth in claim 13 wherein the torque flow paths are characterized by multiple torque ratios, the method and strategy including the step of emulating the speed-torque relationship of the engine by the motor/generator when the speed and torque values are in the second and intermediate operating zones by executing rapid control of the motor/generator during ratio shifts of the power transmission to reduce torque fluctuation as torque transfer between the transmission friction elements occurs in a ratio shift event.

* * * * *